United States Patent Office 3,449,302
Patented June 10, 1969

3,449,302
COPOLYMERS OF VINYLIDENECHLORIDE
Hermann Nachbur, Riehen, Robert Werner, Binningen, and Arthur Maeder, Therwil, Switzerland, assignors to Ciba Limited, Basel, Switzerland, a company of Switzerland
No Drawing. Filed May 3, 1966, Ser. No. 547,168
Claims priority, application Switzerland, May 18, 1965, 6,897/65
Int. Cl. C08f 15/40
U.S. Cl. 260—79.3                    5 Claims

ABSTRACT OF THE DISCLOSURE

New copolymers are provided which are obtained by copolymerizing

80–99.7% vinylidenechloride,
0.1–3% butadienesulphone,
0.1–19.8% of an ethylenically unsaturated film-forming monomer, and
0.1–5% of an ethylenically unsaturated hydrophilic monomer.

The new polymers of this invention are especially useful for coating sheet materials such as paper, cardboard, foils from regenerated cellulose or from plastic to make the materials impermeable to water, gas, steam and fats and heat sealable.

---

It has been found that valuable new copolymers of vinylidenechloride are obtained when, referred to the total weight of the monomers to be polymerized, 80 to 99.7% of vinylidenechloride, 0.1 to 3% of butadienesulphone, 0.1 to 19.8% of an ethylenically unsaturated film-forming monomer and 0.1 to 5% of an ethylenically unsaturated hydrophilic monomer are copolymerized in the presence of a catalyst.

Butadienesulpone [2,5 - dihydrothiophene-1,1-dioxide] corresponds to the formula

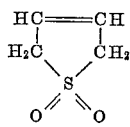

In this connection there should be specially mentioned as ethylenically unsaturated hydrophilic monomers the ethylenically unsaturated polymerizable acids.

The monomer mixture of the four components is advantageously composed as follows:

80 to 92% of vinylidenechloride,
0.5 to 3% of butadienesulphone,
0.3 to 18% of an ethylenically unsaturated film-forming monomer, and
0.5 to 5% of an ethylenically unsaturated hydrophilic monomer.

Particularly good results are obtained with copolymers prepared from:

85 to 90% of vinylidenechloride,
1 to 2% of butadienesulphone,
5 to 10% of an alkyl ester of acrylic, methacrylic or itaconic acid whose alkyl residue contains 1 to 8 carbon atoms, or acrylonitrile and
1 to 4% of an ethylenically unsaturated polymerizable carboxylic acid or its hydroxyalkyl ester whose alkyl residue contains 1 to 3 carbon atoms, or N-vinylpyrrolidone.

Particularly suitable among the above-mentioned film-forming monomers are the acrylic acid methyl ester, the acrylic acid-n-butyl ester or the methacrylic acid-n-butyl ester. Apart from the esters there may also be used acrylonitrile, methacrylonitrile or styrene. Among the above-mentioned hydrophilic monomers acrylic acid is particularly suitable, or alternatively there may be used methacrylic, maleic, crotonic, itaconic acid or their hydroxyalkyl esters whose alkyl residue contains 1 to 3 carbon atoms.

The monomer mixtures of the composition defined above may be polymerized in the usual manner, for example in solution or preferably in an aqueous emulsion. It is advantageous to carry out the polymerization in the absence of oxygen, for example in an inert gas such as nitrogen. The term "in emulsion" as used in this context means that a true emulsion, that is to say a two-phase system consisting of a liquid external and a liquid internal phase, is present at least at the start of the polymerization reaction, but that a solid, finely dispersed polymer may certainly be formed, as is generally in fact the case. It may be of advantage to use an emulsifier, especially an anionic emulsifier, for example an alkyl sulphate whose alkyl residue contains 12 to 18 carbon atoms, or reaction products of formaldehyde with naphthalenesulphonic acids.

Suitable polymerization catalysts are, for example, radical forming peroxides such as hydrogen peroxide or potassium persulphate, or preferably redox systems such as peroxide and ascorbic acid. It is advantageous to use additionally an activator, for example ferrous ions.

In the emulsion polymerization the ratio of aqueous to organic phase may vary within wide limits, for example from 20:1 to 1:2. If an emulsifier is used, an advantageous amount thereof is from 0.5 to 4% referred to the weight of the monomers. The catalysts may likewise be used in the conventional proportions, for example from 0.1 to 3%. The polymerization temperature is advantageously within the range from, for example, 0 to 80° C., and is preferably at least 0° C. and at most 60° C.

The copolymer emulsions or dispersions obtained in this manner may be used as they are for coating a wide variety of flat materials. They are particularly suitable for rendering paper, cardboard, foils from regenerated cellulose or from plastics, for example polyesters, impermeable to water, gas, steam and fats, for use in the packaging industry. As a rule these coatings adhere after drying, for example at room temperature or preferably at an elevated temperature from 70 to 140° C., straight away very firmly to the substrate without need to use a special adhesive interlayer. The layers can be hot-sealed without difficulty. In general, they are extremely resistant towards any kind of mechanical stress; more especially, their efficiency is not impaired when the coated material is folded. The polymer emulsions are also very advantageous for the reason that they do not cause trouble insofar as the material to be coated or the coating machines are concerned.

The copolymers accessible by the present process may, if desired, be converted into powder form. Thus, for example, from the two-phase systems obtained as described above the copolymer may be precipitated, the water removed and, if necessary with the use of an organic solvent, converted into the dry, solid state.

The new copolymers may also be used for coating substrates other than those mentioned above, for example for coating metals, wood, leather or textile materials. Especially in their application to textile materials they may be combined with other agents, for example flame inhibitors, pigments, melamine or urea resins, light filters or antioxidants.

Unless otherwise indicated, parts and percentages in the following examples are by weight.

EXAMPLE 1

In a reactor of 500 parts by volume capacity, equipped with reflux condenser, thermometer and inlet for nitrogen 2.5 parts of a reaction product from naphthalenesulphonic acid and formaldehyde (sodium salt) and
1.25 parts of sodium laurylsulphate are dissolved in 215 parts of deionized water at room temperature, and there are then successively added to this solution
2.6 parts of sodium pyrophosphate [$Na_4P_2O_7.10H_2O$],
5.0 parts of butadienesulphone,
2.5 parts of acrylic acid,
20 parts of acrylic acid methyl ester,
3.0 parts of hydrogen peroxide sodium and
222.5 parts of vinylidenechloride, and the whole is heated under nitrogen to an internal temperature of 30° C. There are then added a solution of
0.6 part of ascorbic acid in
23.0 parts of deionized water and
2.0 parts of an aqueous solution of 0.1% strength of ($NH_4)_2[Fe(SO_4)_2].6H_2O$ (Mohr's salt).

After this last addition the internal temperature rises slowly and reaches 45 to 47° C. after 50 to 60 minutes. The initially considerable reflux of vinylidenechloride then slows down, and the polymerization is finalized by stirring the batch for about 2 hours at 50° C. internal temperature. Yield: 498 parts of a pure emulsion which has a resin content of 50.1%. The pH value is 4.0 and the polymer yield amounts to 97.6% of theory.

After having been stored at 60° C. the emulsion is still stable after at least 24 hours. The viscosity at 25° C. is 8.85 centipoises, or 11 seconds in the Ford cup (4 mm. nozzle).

A film cast on a glass plate, 0.2 to 0.3 mm. thick, and dried at room temperature has the transparency of clear glass and is very flexible.

A specimen of the emulsion is precipitated in a 10% aluminium sulphate solution, suctioned off and rinsed with water until sulphate ions can no longer be detected. The pulverulent resin is suspended in isopropanol heated to about 50° C., suctioned off, twice rinsed with isopropanol and dried first under vacuum at 40° C. and then for 24 hours over phosphorus pentoxide under a pressure of 0.5 mm. Hg. The analysis reveals a mean content of 66.6% of chlorine, corresponding to 91.0% of polyvinylidenechloride, and of 0.3% of sulphur, corresponding to 1.1% of butadienesulphone.

EXAMPLE 2

The procedure used is as described in Example 1, except that 220 parts (instead of 222.5 parts) of vinylidenechloride and 5 parts (instead of 2.5 parts) of acrylic acid are used.

There are obtained 498 parts of a pure emulsion containing 50.8% of resin. The polymer yield is substantially quantitative.

The resulting dispersion is applied by means of a metal doctor knife to one side of parchment paper that had not previously been treated with an adhesion promoter, and then dried for 2 minutes at 140° C. Coating weight: 25 g./m.². The adhesion in the wet state is 60 g.

The adhesion in the wet state is measured as follows: A 15 mm. broad strip of the coated substrate is provided with a hole at either end and suspended vertically for 2 hours in a vessel filled with distilled water. After a mechanical detachment of the coating—which does not take place in a case of optimum adhesion—the strip is attached by means of a special clamp to the pan of a scale accurate to within 1 g. in a manner such that the tensile stress required to pull off one strip vertically can be read off. From three such tests the mean value is determined.

EXAMPLE 3

In the apparatus described in Example 1:

2.5 parts of a reaction product from naphthalenesulphonic acid and formaldehyde (sodium salt) and
1.25 parts of sodium laurylsulphate are dissolved in 216.6 parts of deionized water at room temperature. To this solution there are then added successively
5.0 parts of butadienesulphone
7.5 parts of N-vinylpyrrolidone
20 parts of acrylic acid methyl ester
3.0 parts of hydrogen peroxide solution of 30% strength and
217.5 parts of vinylidenechloride, and the internal temperature is maintained under nitrogen at 25° C. There are then added a solution of
0.6 part of ascorbic acid in
23.0 parts of deionized water and
2.0 parts of an aqueous solution of 0.1% strength of Mohr's salt.

The temperature rises immediately and is maintained by cooling at 35° C. until the reflux subsides. The batch is then heated to an internal temperature of 50 to 55° C., polymerized further for 1 hour at this temperature and then cooled to room temperature.

There are obtained 499 g. of a thinly liquid emulsion having a resin content of 49.6%. The polymer yield is almost quantitative.

The above dispersion is used for coating parchment paper as described in Example 2. The adhesion in the wet state is 25 g.

Comparative experiment to Example 3, without butadienesulphone

In the apparatus described in Example 1:

2.5 parts of a reaction product from naphthalenesulphonic acid and formaldehyde (sodium salt) and
1.25 parts of sodium laurylsulphate are dissolved in 216.6 parts of deionized water at room temperature and to this solution there are successively added
0.8 part of anhydrous sodium pyrophosphate
7.5 parts of N-vinylpyrrolidone
22.5 parts of acrylic acid methyl ester
3.0 parts of hydrogen peroxide solution of 30% strength and
220.0 parts of vinylidenechloride, and the whole is heated under nitrogen to an internal temperature of 30° C. There are then added a solution of
0.6 part of ascorbic acid in
23.0 parts of deionized water and
2.0 parts of an aqueous solution of 0.1% strength of Mohr's salt.

The polymerization is performed with butadienesulphone as described in Example 3, to yield 500 g. of a thinly liquid emulsion having a resin content of 51.2%. The polymer yield is quantitative.

The above dispersion is used for coating parchment paper as described in Example 2. The resulting brittle, substantially inflexible coating does not form a continuous film.

EXAMPLE 4

In the apparatus described in Example 1:

2.5 parts of a reaction product from naphthalenesulphonic acid and formaldehyde (sodium salt) and
1.25 parts of sodium laurylsulphate are dissolved in
215.8 parts of deionized water at room temperature, and to this solution there are successively added
0.8 part of anhydrous sodium pyrophosphate
5.0 parts of butadienesulphone
5.0 parts of methacrylic acid
20.0 parts of acrylic acid methyl ester
3.0 parts of hydrogen peroxide solution of 30% strength and
220.0 parts of vinylidenechloride and the internal temperature is adjusted to 25° C. under nitrogen. There are then added a solution of
0.6 part of ascorbic acid in
23.0 parts of deionized water and 2.0 parts of an aqueous solution of 0.1% strength of Mohr's salt.

The polymerization is carried out as described in Example 3, to yield 502 g. of a thinly liquid emulsion having a resin content of 50.7%. The polymer yield is substantially quantitative. The dispersion is applied to parchment paper as described in Example 2. The adhesion in the wet state amounts to 15 g.

EXAMPLE 5

In the apparatus described in Example 1:

2.5 parts of a reaction product from naphthalenesulphonic acid and formaldehyde (sodium salt) and
1.25 parts of sodium laurylsulphate are dissolved in
215.8 parts of deionized water at room temperature. To this solution there are successively added
0.8 part of anhydrous sodium pyrophosphate
5.0 parts of butadienesulphone
7.5 parts of propyleneglycol monoacrylate (acrylic acid-γ-hydroxypropyl ester)
20.0 parts of acrylic acid methyl ester
3.0 parts of hydrogen peroxide solution of 30% strength and
217.5 parts of vinylidenechloride and the whole is heated to an internal temperature of 30° C. under nitrogen. There are then added a solution of
0.6 part of ascorbic acid in
23.0 parts of deionized water and
2.0 parts of an aqueous solution of 0.1% strength of Mohr's salt.

The polymerization is carried out as described in Example 3, to yield 499 g. of a thinly liquid emulsion having a resin content of 51.2%. The polymer yield is quantitative. The dispersion is used for coating parchment paper as described in Example 2. The adhesion in the wet state amounts to 45 g.

EXAMPLE 6

In the apparatus described in Example 1:

2.5 parts of a reaction product from naphthalenesulphonic acid and formaldehyde (sodium salt) and
1.25 parts of sodium laurylsulphate are dissolved in
216.6 parts of deionized water at room temperature, and to this solution there are successively added
0.8 part of anhydrous sodium pyrophosphate
5.0 parts of butadienesulphone
5.0 parts of itaconic acid
20.0 parts of acrylic acid methyl ester
3.0 parts of hydrogen peroxide solution of 30% strength and
220 parts of vinylidenechloride, and the internal temperature is adjusted to 25° C. under nitrogen. There are then added a solution of
0.6 part of ascorbic acid in
23.0 parts of deionized water and
2.0 parts of an aqueous solution of 0.1% strength of Mohr's salt.

The polymerization is carried out as described in Example 3, to yield 494 g. of a thinly liquid emulsion having a resin content of 48.4%. The polymer yield amounts to 94% of the theoretical. The dispersion is used for coating parchment paper as described in Example 2. The adhesion in the wet state amounts to 35 g.

EXAMPLE 7

In the apparatus described in Example 1:

2.5 parts of a reaction product from naphthalenesulphonic acid and formaldehyde (sodium salt) and
1.25 parts of sodium laurylsulphate are dissolved in
216.6 parts of deionized water at room temperature. To this solution there are successively added
5.0 parts of butadienesulphone
7.5 parts of N-vinylpyrrolidone
10.0 parts of acrylic acid-n-butyl ester
3.0 parts of hydrogen peroxide solution of 30% strength and
227.5 parts of vinylidenechloride, and the internal temperature is adjusted to 25° C. under nitrogen. There are then added a solution of
0.6 part of ascorbic acid in
23.0 parts of deionized water and
2.0 parts of an aqueous solution of 0.1% strength of Mohr's salt.

The polymerization is carried out as described in Example 3, to yield 495 g. of a thinly liquid emulsion having a resin content of 49.8%. The polymer yield is 96.6% of the theoretical.

EXAMPLE 8

In the apparatus described in Example 1:

2.0 parts of a reaction product from naphthalenesulphonic acid and formaldehyde (sodium salt) and
2.0 parts of sodium laurylsulphate are dissolved in
281.5 parts of deionized water at room temperature. To this solution there are successively added
2.0 parts of butadienesulphone
4.0 parts of methacrylic acid
34.0 parts of methacrylic acid-n-butyl ester
3.0 parts of hydrogen peroxide solution of 30% strength and
160.0 parts of vinylidenechloride, and the internal temperature is adjusted to 25° C. under nitrogen. There are then added a solution of
0.5 part of ascorbic acid in
10.0 parts of deionized water and
1.5 parts of an aqueous solution of 0.1% strength of Mohr's salt.

The polymerization is carried out as described in Example 3, to yield 498 g. of a thinly liquid emulsion having a resin content of 39.1%. The polymer yield is 95.6% of the theoretical.

EXAMPLE 9

Cardboard used for making cups (weighing 210 g. per m.$^2$) is coated twice with an air brush with the emulsion of Example 1 with intermediate drying. The behaviour of the dispersion during the application is perfect. The weight of the resulting coating is 18.0 g./m.$^2$. The coating is completely free from pores both in the flat and in the internal crease and even when the material is folded outwards only few cracks are revealed by the rhodamine test in the film in spite of the considerable stretch to which it is subjected in this test. The cardboard coated in this manner displays excellent impermeability to steam, fat and gas, it lends itself well to hot-sealing and behaves satisfactorily towards blocking.

EXAMPLE 10

Parchment paper weighing 50 g./m.$^2$ is coated twice with the emulsion of Example 1 by means of an air brush with intermediate drying. The coating weighs 18.5 g./m.$^2$. The dispersion behaves well during the application. The coating adheres well to the substrate without requiring the provision of an adhesion promoter on the latter. By virtue of the good flexibility of the film it remains completely free from cracks in the flat and in internal creases even when sharp folds are made. The impermeability of the coating towards steam, fat and gas is very good.

EXAMPLE 11

A polyester foil marketed under the registered trade mark "Hostaphan R 12" is coated once with the emulsion of Example 1 by means of an air brush. The resulting coating weighs 3.7 g./m.$^2$. The dispersion behaves well during the application. The resulting film is clear and transparent and adheres very firmly to the Hostaphan foil without the latter having been pretreated with an adhesion promoter. The impermeability to steam, fat and gas is very good.

What is claimed is:

1. Copolymers of vinylidenechloride, obtained by copolymerizing:

80 to 99.7% by weight of vinylidenechloride structural elements
0.1 to 3% by weight of butadienesulphone structural elements
0.1 to 19.8% by weight of structural elements of an ethylenically unsaturated film-forming monomer selected from the group consisting of an alkyl ester of acrylic, methacrylic and itaconic acid whose alkyl residue contains 1 to 8 carbon atoms, and of acrylonitrile, and
0.1 to 5% by weight of structural elements of an ethylenically unsaturated hydrophilic monomer selected from the group consisting of elements of an ethylenically unsaturated polymerizable carboxylic acid, or a hydroxyalkyl ester thereof whose alkyl residue contains 1 to 3 carbon atoms, and of N-vinylpyrrolidone, in an aqueous emulsion in the presence of a catalyst selected from the group consisting of a radical-forming peroxide and a redox system at a temperature from 0 to 80° C.

2. Copolymers of vinylidenechloride according to claim 1, composed of:

80 to 92% of vinylidenechloride structural elements
0.5 to 3% of butadienesulphone structural elements
3 to 18% of structural elements of an ethylenically unsaturated film-forming monomer selected from the group consisting of an alkyl ester of acrylic, methacrylic and itaconic acid whose alkyl residue contains 1 to 8 carbon atoms, and of acrylonitrile, and
0.5 to 5% of structural elements of an ethylenically unsaturated hydrophilic monomer selected from the group consisting of elements of an ethylenically unsaturated polymerizable carboxylic acid, or a hydroxyalkyl ester thereof whose alkyl residue contains 1 to 3 carbon atoms, and of N-vinylpyrrolidone.

3. Copolymers of vinylidenechloride according to claim 1, composed of:

85 to 90% of vinylidenechloride structural elements
1 to 2% of butadienesulphone structural elements
5 to 10% of structural elements of a member selected from the group consisting of an alkyl ester of acrylic, methacrylic and itaconic acid whose alkyl residue contains 1 to 8 carbon atoms, and of acrylonitrile and
1 to 4% of structural elements of a member selected from the group consisting of elements of an ethylenically unsaturated polymerizable carboxylic acid, or a hydroxyalkyl ester thereof whose alkyl residue contains 1 to 3 carbon atoms, and of N-vinylpyrrolidone 4. Copolymers of vinylidenechloride according to claim 1, composed of:

85 to 90% of vinylidenechloride structural elements
1 to 2% of butadienesulfone structural elements
5 to 10% of structural elements of an alkyl ester selected from the group consisting of acrylic acid methyl ester, acrylic acid-n-butyl ester and methacrylic acid-n-butyl ester and
1 to 4% of acrylic acid structural elements.

5. Copolymers of vinylidenechloride according to claim 1, composed of:

84% of vinylidenechloride structural elements
2% of butadienesulfone structural elements
8% of methyl acrylate structural elements and
1% of acrylic acid structural elements.

References Cited
UNITED STATES PATENTS

| | | |
|---|---|---|
| 3,017,397 | 1/1962 | Fournet et al. |
| 3,192,231 | 6/1965 | Welcher. |
| 3,235,535 | 2/1966 | Horn _____ 260—87.7 |
| 3,310,535 | 3/1967 | Mazzolini et al. _____ 260—87.7 |

JAMES A. SEIDLECK, *Primary Examiner.*

U.S. Cl. X.R.

117—155, 161; 260—29.6, 78.5, 853